3,352,909
NOVEL 4-(ORGANOSULFONYL)SEMICARBAZIDES
Adnan A. R. Sayigh, North Haven, and Henri Ulrich, North Branford, Conn., assignors to The Upjohn Company, Kalamazoo, Mich., a corporation of Delaware
No Drawing. Filed May 13, 1965, Ser. No. 455,626
6 Claims. (Cl. 260—554)

This invention relates to a process for the preparation of novel derivatives of semicarbazide and to the novel compounds so produced and is more particularly concerned with a process for the preparation of 4-(organosulfonyl)semicarbazides and with the novel 4-(organosulfonyl)semicarbazides so produced.

The present invention, in its broadest aspect, provides a process for the preparation of 4-(organosulfonyl)semicarbazides having no substituent in the 1-position which process comprises reacting the corresponding organosulfonylisocyanate with hydrazine.

The process of the invention can be represented schematically as follows:

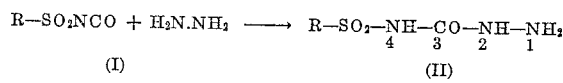

wherein R represents an organic moiety. The numbering of the semicarbazido moiety in the above equation is that employed by chemical abstracts; this system of numbering will be followed throughout this specification in the naming of compounds etc.

The above equation shows the reaction of a mono-organosulfonyl isocyanate for purposes of simple illustration but, as will be discussed below, the reaction can be applied equally to organopolysulfonylisocyanates wherein each of the sulfonylisocyanato groups reacts with hydrazine as above to give the corresponding polysemicarbazide. In addition, any group, other than sulfonylisocyanato, present in the starting organosulfonyl isocyanate which is capable of undergoing reaction with hydrazine under the conditions of the reaction, will be converted during the process of the invention. For example, an isocyanato group present as substituent in the starting organosulfonylisocyanate (i.e. an isocyanato group other than that present in the sulfonylisocyanato group) will be converted to a 3-aminoureido group (—NHCONHNH$_2$) by the process of the invention. Similarly a reactive halogen atom present in the starting organosulfonylisocyanate will be replaced by hydrazino during the course of the reaction, a carbonyl group converted to hydrazono, and the like.

The process of the invention is carried out by bringing together the sulfonylisocyanate (I) and hydrazine in the presence of inert solvents such as benzene, toluene, xylene, pentane, hexane, octane, petroleum ether, dimethylformamide, and the like. The reactants can be brought together in any convenient manner. Advantageously the sulfonylisocyanate is added to a solution of the hydrazine in an inert solvent. The reaction is generally exothermic and external cooling can be applied, as desired, to control the reaction rate. The reaction can be carried out over a wide range of temperature advantageously from about 0° C. to about 100° C. The proportions of reactants employed can be varied over a wide range. Advantageously the hydrazine is present in an amount in excess of the stoichiometric proportion in order to avoid formation of the bis compound

R—SO$_2$—NHCONHNHCONH—SO$_2$—R

The sulfonyl semicarbazide (II) obtained in the process of the invention is amphoteric and, by virtue of the acidic hydrogen atom on the nitrogen in the 4-position, forms a salt with bases including hydrazine. Hence, it is advantageous to employ an excess of hydrazine, preferably at least 2 moles of hydrazine for each isocyanate group in the compound (I), in order to obtain good yields of compound (II). Alternatively, it has been found that loss of useful hydrazine by salt formation with the product (II), can be avoided entirely or reduced to a minimum by carrying out the reaction in the presence of at least one equivalent of a tertiary amine for each equivalent of compound (II) to be formed. Using a tertiary amine in this way enables good yields of compound (II) to be obtained without the necessity of employing an excess of hydrazine.

Examples of tertiary amines which can be used in the process described above are pyridine, quinoline, isoquinoline, N-alkylpiperidine, such as N-methylpiperidine, N-ethylpiperidine, and the like, 1,4-dialkylpiperazines such as 1,4-dimethylpiperazine, 1,4-diethylpiperazine, 1-methyl-4-ethylpiperazine, and the like, trialkylamines such as triethylamine, tripropylamine, and the like, and N,N-dialkylanilines such as N,N-dimethylaniline, N,N-diethylaniline, and the like.

Generally speaking the reaction of the compound (I) with hydrazine whether carried out in the presence or absence of a tertiary amine, takes place rapidly but, if necessary, the reaction time can be extended, for example, to the order of several hours depending on the nature of the reactants. The course of the reaction can be followed by spectral analysis or other means conventional in the art to determine when the desired end point has been reached. The desired product (II) is isolated from the reaction mixture by conventional procedure. For example, the reaction mixture can be acidified, for example using a mineral acid such as sulfuric acid, hydrochloric acid, and the like. The organic solvent solution of the desired product is separated and evaporated to dryness. The product (II) can be purified by conventional procedures such as recrystallization (in the case of solids), distillation (in the case of liquids), chromatography, countercurrent distribution and the like, or any combination of these steps.

The process of the invention is one of general applicability and can be used to convert any sulfonylisocyanate to the corresponding 4-(organosulfonyl)semicarbazide having no substituent in the 1-position. The 4-(organosulfonyl)semicarbazides so obtained are useful as agents in the isolation, purification, and characterization of carbonylic compounds as discussed in detail hereinafter.

The nature of the organic moiety in the organosulfonylisocyanate employed as starting material, and hence in the 4-(organosulfonyl)semicarbazide obtained as end product, in the process of the invention is for the most part unimportant and is pertinent to the successful operation of the process of the invention only to the extent that it should be inert under the conditions of the reaction i.e. the organic moiety should not interfere with the principal course of the reaction. Examples of organic moieties which can be present in the organosulfonylisocyanates employed as starting materials are (a) mono and polyvalent hydrocarbyl such as alkyl, for example, methyl, propyl, isobutyl, octyl, dodecyl, octadecyl, and the like; alkenyl, for example, allyl, butenyl, octenyl, undecenyl, octadecenyl, and the like; cycloalkyl, for example, cyclopropyl, cyclobutyl, cyclopentyl, cyclohexyl, cycloheptyl, cyclooctyl, and the like; aralkyl, for example, benzyl, phenethyl, phenylpropyl, benzhydryl, triphenylmethyl, and the like; aryl, for example, phenyl, tolyl, xylyl, biphenylyl, naphthyl, anthracenyl, and the like; arene, for example, phenylene, tolylene, naphthylene, and the like, alkylene, for example, phenylene, tolylene, naphthylene, and the like; alkylene, for example, methylene, ethylene, trimethylene, 1,2-propylene, hexylene, octylene, dodecylene, and the like; alkanetriyl, for example, 1,2,3-propanetriyl, 1,2,4- butanetriyl, 1,3,4-hexanetriyl, 1,3,8-octanetriyl and the like; and (b) mono and polyvalent heterocyclic moieties derived from heterocycles such as pyridine, pyrrolidine, quinoline, isoquinoline, furan, phenanthridine, acridine, carbazole, dibenzfuran, naphthiminazole, phenazine, phenothiazine, phenoxazine, benzoxazole, indole, benzpyran, cinnoline, coumarin, oxazole, pyrazole, thiazole, pyrimidine, triazine, and the like.

Each of the above organic moieties can be substituted by one or more substituents which do not interfere with the course of the process of the invention. Such substituents include groups such as isocyanato which are converted (isocyanato to 3-aminoureido) by hydrazine during the process of the invention, but which do not hinder or prevent the formation of the 4-(organosulfonyl)semicarbazide in the process of the invention.

Examples of substituents which can be present on the above organic moieties are alkyl, alkoxy, alkenyloxy, alkylthio, aryl, aralkyl, tertiaryamino, nitro, cyano, isocyanato, halo, alkoxycarbonyl, and the like.

In a particular aspect of the present invention there can be prepared certain groups of novel compounds which can be represented by the following formulae:

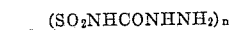
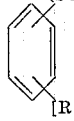
(III)

and $R_2$—$SO_2NHCONHNH_2$ (IV)

In the above formulae $R_1$ is selected from the group consisting of hydrogen, lower-alkyl, lower-alkoxy, lower-alkenyloxy, halo, nitro, alkoxycarbonyl, alkylthio, tertiaryamino and (3-aminoureido), $R_2$ is selected from the class consisting of alkyl from 1 to 12 carbon atoms, inclusive, and cycloalkyl, $n$ is an integer from 1 to 2 and $m$ is an integer from 0 to $(6-n)$.

The term "lower-alkyl" employed throughout the specification and claims means alkyl from 1 to 8 carbon atoms, inclusive, such as methyl, ethyl, propyl, butyl, pentyl, hexyl, heptyl, octyl, and isomeric forms thereof. The term "lower-alkoxy" employed throughout the specification and claims means alkoxy from 1 to 8 carbon atoms, inclusive, such as methoxy, ethoxy, propoxy, butoxy, pentoxy, hexyloxy, heptyloxy, octyloxy, and isomeric forms thereof. The term "lower-alkenyloxy" employed throughout the specification and claims means alkenyloxy from 3 to 8 carbon atoms, inclusive, such as allyloxy, butenyloxy, pentenyloxy, hexenyloxy, heptenyloxy, octenyloxy, and isomeric forms thereof. The term "halogen" as employed throughout the specification and claims means fluorine, chlorine, bromine, and iodine. The term "alkoxycarbonyl" as employed throughout the specification and claims means the group —COOAlkyl wherein alkyl means lower-alkyl as above defined. The term "alkylthio" as employed throughout the specification and claims means alkylthio from 1 to 8 carbon atoms, inclusive, such as methylthio, ethylthio, propylthio, butylthio, pentylthio, hexylthio, heptylthio, octylthio, and isomeric forms thereof. The term "tertiary amino" as employed throughout this specification and claims means the group

wherein $R_3$ and $R_4$ taken individually represent lower-alkyl and $R_3$ and $R_4$ taken together with the attached N atom represent a 5 to 7 ring atom heterocyclic radical such as pyrrolidino, alkylpyrrolidino, for example, 2-methylpyrrolidino, 2,2 - dimethylpyrrolidino, 3 - ethylpiperidino, 4-isopropylpiperidino and the like, N-alkyl-piperazino, for example N-methylpiperazino, N-ethylpiperazino and the like, morpholino, hexamethyleneimino, and the like. The term "cycloalkyl" as employed throughout the specification and claims means cyclobutyl, cyclopentyl, cyclohexyl, cycloheptyl, cyclooctyl, and isomeric forms thereof.

The compounds having the Formula III and IV above are useful as blowing agents in high polymers such as polyethylene, polypropylene, natural rubber, butadiene/acrylonitrile rubber, styrene/butadiene copolymers, polyvinyl chloride and the like using techniques known in the art; see, for example, U.S. 3,152,176. Generally the blowing agent is incorporated into the polymer by mixing the blowing agent with the polymer on a two roll rubber mill or in any other suitable mixing apparatus and thereafter heating the mixture in a mold or extruding the mixture at a suitable temperature. Generally speaking, from about 0.5 to about 10 parts by weight of blowing agent are employed for each 100 parts by weight of polymer.

The compounds of Formulae III and IV above, as well as all the 4-(organosulfonyl)semicarbazides produced by the process of the invention, are also useful in the separation of carbonyl compounds from mixtures containing the same and in the purification and identification of said carbonyl compounds. Thus, the 4-substituted semicarbazides react with carbonyl group containing compounds, in the same manner as semicarbazide itself, to produce the corresponding 4-substituted semicarbazones. The latter compounds are generally solids whose melting point can be used to characterize the carbonyl compound from which they are formed. Further, the ready separation of the 4-(organosulfonyl) semicarbazone as an insoluble solid from solutions of carbonyl compound in solvents such as methanol, ethanol, and the like, forms a convenient method of separating the carbonyl compound from mixtures containing said compound. The isolation of the carbonyl compound as its 4-(organosulfonyl)semicarbazone followed by acid hydrolysis of the latter enables the carbonyl compound to be isolated in a high state of purity.

In addition, the 4-(organosulfonyl)semicarbazones, prepared from a carbonyl compound and a 4-(organosulfonyl)semicarbazide produced according to the invention, have the advantage of possessing an acidic hydrogen atom on the nitrogen atom in the 4-position. Hence, these compounds can be readily solubilized using aqueous alkali. This property offers an advantage in the manipulation of these compounds which will be readily appreciated by one skilled in the art.

Further, due to the presence of the aforesaid acidic hydrogen on the nitrogen atom in the 4-position of the 4 - (organosulfonyl)semicarbazides produced by the process of the invention, the latter compounds can be converted to their salts with alkali metals, alkaline earth metals, ammonia and with organic amines. For example, by treating an aqueous or aqueous alcoholic solution or suspension of a 4-(organosulfonyl)semicarbazide, produced according to the invention, with a stoichiometric amount of the appropriate base such as sodium hydroxide, potassium hydroxide, and the like, the corresponding sodium, potassium, calcium and like salts are obtained and can be isolated by evaporation of the solution so prepared. Ammonium salts are obtained in like manner by substituting a nitrogenous base, such as ammonia, hydrazine, or a suitable amine, for the inorganic base. Advantageously the neutralization is effected in an organic solvent such as methanol, ethanol, isopropanol, ethyl acetate, and the like. Examples of amines which are representative of those which can be used in the above salt formation are: mono-, di-, and trimethylamines, mono-, di-, and triethylamines, mono-, di-, and tripropylamines (iso and normal), ethyldimethylamine, benzyldiethylamine, cyclohexylamine, benzylamine, dibenzylamine, and like lower-aliphatic, lower-cycloaliphatic, and lower-araliphatic amines up to and including about 8 carbon atoms; heterocyclic amines such as piperidine, morpholine, pyrrolidine, piperazine, and the lower-alkyl derivatives thereof such as 1-methylpiperidine, 4-ethylmorpholine, 1-isopropylpyrrolidine, 1,4-dimethylpiperazine, 1-n-butylpiperidine, 2-methylpiperidine, 1-ethyl-2-methylpiperidine, and the like.

The salts of the 4-(organosulfonyl)semicarbazides prepared as described above are useful as intermediates in the purification of said 4-(organosulfonyl)semicarbazides; i.e. the latter can be isolated from admixture with impurities by salt formation, followed by liberation of the free 4-(organicsulfonyl)semicarbazides by acidification of the salt. In addition, the salts of 4-(organosulfonyl)semicarbazides prepared as described above possess the same properties as carbonyl compound characterization and purification agents as the free 4-(organosulfonyl)semicarbazides as discussed above.

The compounds of Formulae III and IV above can be prepared by employing the corresponding sulfonyl isocyanates having the formulae

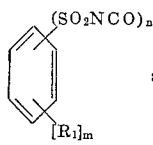

and $R_2$—$SO_2NCO$ wherein $R_1$, $R_2$, $n$ and $m$ have the significance hereinbefore defined, as starting materials in the process of the invention. The compounds (III) where $R_1$ is (3-aminoureido) are obtained by employing the corresponding starting sulfonyl isocyanate having an isocyanato group in the appropriate position, said isocyanato group being converted to (3-aminoureido) in the process of the invention. The proportion of hydrazine employed in the reaction mixture is adjusted in the appropriate manner to allow for this conversion.

The sulfonyl isocyanates employed as starting materials in the process of the invention are, for the most part, known in the art. They can be prepared conveniently by reacting the corresponding sulfonylurea

wherein alkyl represents lower-alkyl, with phosgene at a temperature within the range of about 0° C. to about 175° C. There is thereby generated the desired sulfonyl isocyanate R—$SO_2NCO$ and the corresponding alkyl isocyanate, alkyl —NCO. The starting sulfonylurea is obtained conveniently by the reaction of the appropriate sufonamide with an alkyl isocyanate, the latter being regenerated in the above reaction.

In carrying out the above reaction in the preparation of the starting materials it is preferred to employ a slight excess of phosgene, of the order of about 1% to about 25% by weight beyond the theoretical amount required. The precise conditions employed in this reaction are illustrated more fully in Preparations 1–4 below.

A convenient process for the preparation of the arenesulfonylisocyanates employed as starting materials in the process of the invention comprises reacting the appropriate arenesulfonamide with phosgene in the presence of a catalytic amount (from about 0.1 mole to about 0.8 mole per mole of arenesulfonamide) of a hydrocarbyl isocyanate such as ethyl isocyanate, butyl isocyanate, hexamethylene diisocyanate, phenyl isocyanate, o-tolyl isocyanate, cyclopentyl isocyanate, allyl isocyanate, and the like. Preferably the reaction is carried out at a temperature of about 60° C. to about 200° C. in the presence of an inert organic solvent such as benzene, toluene, xylene, chlorobenzene, dichlorobenzene, chlorotoluene, chloroform, carbon tetrachloride, and the like. The desired arenesulfonylisocyanate so produced and the hydrocarbyl isocyanate employed as catalyst can be separated by fractional distillation and like procedures, the hydrocarbyl isocyanate employed as catalyst being so chosen that its boiling point is sufficiently higher or lower than that of the desired arenesulfonyl isocyanate to permit easy separation.

The following preparations and examples describe the manner and process of making and using the invention and set forth the best mode contemplated by the inventors of carrying out the invention but are not to be construed as limiting.

PREPARATION 1

*p-Tolylsulfonyl isocyanate*

Phosgene (150 g.; 1.5 moles) was added to a stirred solution of 1-butyl-3-(p-tolylsulfonyl)urea (270 g.; 1.0 mole) in 1350 ml. of chlorobenzene in the range 80° to 100° C. over a period of 150 minutes. The addition was accompanied by a vigorous evolution of hydrogen chloride. The resulting mixture was then heated to the boiling point and excess phosgene was removed by purging with nitrogen for 30 minutes. Distillation of the chlorobenzene and n-butyl isocyanate, followed by vacuum distillation of the residue gave 168.5 g. of p-tolylsulfonyl isocyanate; B.P. 119–120° C. at 4 mm.

PREPARATION 2

*p-Chlorophenylsulfonyl isocyanate*

Phosgene (4.0 g.; 0.04 mole) was added gradually during 10 minutes to a stirred solution of 1-propyl-3-(p-chlorophenylsulfonyl)urea (9.5 g.; 0.035 mole) in 95 ml. of chlorobenzene with cooling to maintain the resulting mixture at about 25° C. The mixture was then heated with continued stirring at the boiling point under reflux for 30 minutes. A slow stream of phosgene was passed below the surface of the reaction mixture during that reflux period. Excess phosgene was then removed by purging with nitrogen. Propyl isocyanate and chlorobenzene were removed by distillation at reduced pressure, and the residue was distilled to give 4.4 g. of p-chlorophenylsulfonyl isocyanate; B.P. 94–95° C. at 0.8 mm.

Similarly replacing 1-propyl-3-(p-chlorophenylsulfonyl)urea in the above procedure by 1-propyl-3-(m-bromophenylsulfonyl)urea and 1-propyl-3-(p-fluorophenylsulfonyl)urea [each prepared by reacting the appropriate halobenzenesulfonamide with propyl isocyanate] there are obtained m-bromophenylsulfonyl isocyanate and p-fluorophenylsulfonyl isocyanate respectively.

PREPARATION 3

*4-methyl-m-phenylenedisulfonyl diisocyanate*

A solution of phosgene (4.1 g.; 0.041 mole) in 30 ml. of chlorobenzene was added gradually during 8 minutes to a stirred solution of 1,1'-[(4-methyl-m-phenylene)disulfonyl]bis[3-butylurea] (9.0 g.; 0.02 mole) in 60 ml. of chlorobenzene with cooling to maintain the mixture in the range about 8° to 10° C. The resulting mixture was then boiled under reflux with stirring for 20 minutes. A slow stream of phosgene was passed below the surface of the reaction mixture during that reflux period. Excess phosgene was then removed by purging with nitrogen. Chlorobenzene and butyl isocyanate were removed by distillation, and the resulting residue was distilled at reduced pressure to give 2.3 g. of 4-methyl-m-phenylenedisulfonyl diisocyanate; B.P. 171–175° C. at 1.8 mm.

Similarly, using the above procedure, but replacing 1, 1'-[(4-methyl - m-phenylene)disulfonyl]bis[3-butylurea] by 1,1'-(m-phenylenedisulfonyl)bis[3-butylurea] and 1, 1'-(p-phenylenedisulfonyl)bis[3-butylurea] there are obtained m-phenylenedisulfonyl diisocyanate and p-phenylenedisulfonyl diisocyanate, respectively.

PREPARATION 4

*m-Isocyanatophenylsulfonyl isocyanate*

1-butyl-3-metanilylurea (40 g.; 0.15 mole) was added gradually during 7 minutes to a stirred solution of phosgene (30 g.; 0.3 mole) in 400 ml. of chlorobenzene with cooling to maintain the mixture in the range about 0° to 5° C. After stirring for an additional 10 minutes without cooling, a slow stream of phosgene was passed into the reaction mixture while the latter was heated to boiling and boiled under reflux for 60 minutes. Excess phosgene was then removed by purging the hot mixture with nitrogen, and the reaction mixture was filtered. Chlorobenzene and butyl isocyanate were removed from the filtrate by distillation, and the resulting residue was distilled at reduced pressure to give 15.3 g. of m-isocyanatophenylsulfonyl isocyanate; B.P. 135–136° C. at 1.1 mm.

Similarly, using the above procedure but replacing 1-butyl-3-metanilylurea by 1-butyl-3-sulfanilylurea, there is obtained p-isocyanatophenylsulfonyl isocyanate.

Following the procedure of Preparation 1, but using in place of 1-butyl-3-(p-tolylsulfonyl)urea as a reactant, 1-butyl-3-ethylsulfonylurea;
1-butyl-3-isopropylsulfonylurea;
1-butyl-3-hexylsulfonylurea;
1-butyl-3-(6-chlorohexylsulfonyl)urea;
1-butyl-3-dodecylsulfonylurea;
1-butyl-3-cyclohexylsulfonylurea;
1-butyl-3-cycloheptylsulfonylurea;
1-butyl-3-(p-methoxyphenylsulfonyl)urea;
1-butyl-3-(2,5-dimethylphenylsulfonyl)urea;
1-butyl-3-benzylsulfonylurea;
1-butyl-3-allylsulfonylurea;
1-butyl-3-propargylsulfonylurea;
1-butyl-3-(p-dimethylaminophenylsulfonyl)urea;
1-butyl-3-(1-naphthylsulfonyl)urea;
1-butyl-3-(2,4,6-trichlorophenylsulfonyl)urea;
1-butyl-3-(4-pyridylsulfonyl)urea;
1-ethyl-3-(m-allyloxyphenylsulfonyl)urea;
1-butyl-3-(m-β-methallyloxyphenylsulfonyl)urea;
1-butyl-3-(p-nitrophenylsulfonyl)urea;
1-ethyl-3-(m-ethoxycarbonylphenylsulfonyl)urea;
1-butyl-3-(m-methoxycarbonylphenylsulfonyl)urea;
1-ethyl-3-(p-butoxycarbonylphenylsulfonyl)urea;
and 1-butyl-3-(p-methylthiophenylsulfonyl)urea [each of said ureas being obtained by reaction of the appropriate alkyl isocyanate and sulfonamide], there are obtained ethylsulfonyl isocyanate;
isopropylsulfonyl isocyanate;
hexylsulfonylisocyanate;
6-chlorohexylsulfonyl isocyanate;
dodecylsulfonyl isocyanate;
cyclohexylsulfonyl isocyanate;
cycloheptylsulfonyl isocyanate;
p-methoxyphenylsulfonyl isocyanate;
2,5-dimethylphenylsulfonyl isocyanate;
benzylsulfonyl isocyanate;
allylsulfonyl isocyanate;
propargylsulfonyl isocyanate;
p-dimethylaminophenylsulfonyl isocyanate;
1-naphthylsulfonyl isocyanate;
2,4,6-trichlorophenylsulfonyl isocyanate;
4-pyridylsulfonyl isocyanate;
m-allyloxyphenylsulfonyl isocyanate;
m-β-methallyloxyphenylsulfonyl isocyanate;
p-nitrophenylsulfonyl isocyanate;
m-ethoxycarbonylphenylsulfonyl isocyanate;
m-methoxycarbonylphenylsulfonyl isocyanate;
p-butoxycabonylphenylsulfonyl isocyanate;
and p-methylthiophenylsulfonyl isocyanate, respectively.

EXAMPLE 1

*4-phenylsulfonylsemicarbazide*

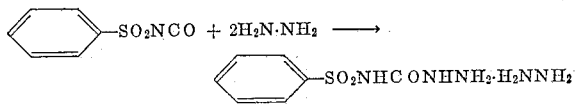

A total of 18.3 g. (0.1 mole) of benzenesulfonyl isocyanate was added dropwise with stirring over a period of 18 minutes to a solution of 8 g. (0.25 mole) of anhydrous (95%) hydrazine in 50 ml. of dimethylformamide. The temperature of the mixture rose gradually to a maximum of 50° C. The resulting mixture was stirred for 1 hour after the above addition was complete. At the end of this time the reaction mixture was diluted with 150 ml. of water and acidified using conc. hydrochloric acid. The solid which separated was isolated by filtration, washed with water, and dried. There was thus obtained 10.4 g. (48% yield) of 4-phenylsulfonylsemicarbazide in the form of a solid having a melting point of 187 to 193° C. with decomposition. The infrared spectrum of the compound (potassium bromide pellet) exhibited a maximum at 5.85μ.

EXAMPLE 2

*4-p-tolylsulfonylsemicarbazide*

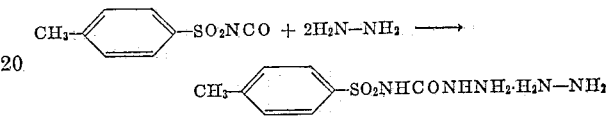

A total of 19.7 g. (0.1 mole) of p-toluenesulfonyl isocyanate was added dropwise with stirring and cooling over a period of 20 minutes to a solution of 8 g. (0.25 mole) of anhydrous (95%) hydrazine in 50 ml. of dimethylformamide. The temperature of the reaction reached a maximum of 28° C. The reaction mixture was stirred for a further 30 minutes after addition was complete. The resulting mixture was diluted with 200 ml. of water and then acidified with dilute hydrochloric acid. The solid which separated was isolated by filtration, washed with water, and dried. There was thus obtained 21 g. (92%) of 4-p-tolylsulfonyl semicarbazide in the form of a solid having a melting point of 178 to 182° C. with decomposition. Recrystallization of this material from glacial acetic acid gave white crystals melting point 200 to 202° C. with decomposition. The infrared spectrum of the material (potassium bromide pellet) exhibited a maximum at 5.85μ.

*Analysis.*—Calcd. for $C_8H_{11}N_3O_3S$: C, 41.92; H, 4.83. Found: C, 42.00; H, 4.46.

EXAMPLE 3

*4-p-chlorophenylsulfonylsemicarbazide*

A total of 108.7 g. (0.5 mole) of p-chlorobenzene sulfonyl isocyanate was added dropwise with cooling and stirring over a period of 1 hour to a solution of 40 g. (1.25 mole) of anhydrous (95%) hydrazine in 250 ml. of dimethylformamide. The reaction temperature was 10 to 20° C. The reaction mixture was stirred for a further hour after the addition was complete before being diluted with 800 ml. of water and filtered. The filtrate was acidified using conc. hydrochloric acid and the solid which separated was isolated by filtration, washed, and dried. There was thus obtained 81.5 g. (65% yield) of p-chlorophenylsulfonylsemicarbazide in the form of a solid having a melting point of 218 to 228° C. with decomposition. The infrared spectrum of the material (potassium bromide pellet) exhibited a maximum at 5.87μ.

EXAMPLE 4

*4-phenylsulfonylsemicarbazide*

A total of 18.3 g. (0.1 mole) of benzenesulfonyl isocyanate was added dropwise with stirring and cooling over a period of about 20 minutes to a solution of 4 g. (0.125 mole) of anhydrous (95%) hydrazine and 10.1 g. (0.1 mole) of triethylamine in 50 ml. of dimethylformamide. The mixture so obtained was stirred for a further hour before being diluted with water and acidified with conc. hydrochloric acid. The solid which separated was isolated by filtration, washed with water and dried. There was thus obtained 4-phenylsulfonylsemicarbazide in the form of a solid identical with the material produced as described in Example 1.

Using the above procedure but replacing triethylamine with an equivalent quantity of triisopropylamine, tripentylamine, pyridine, N-methylpiperidine, N,N-dimethylaniline and the like tertiary amines, there is obtained 4-phenylsulfonyl isocyanate in comparable yield.

EXAMPLE 5

4-(m-bromophenylsulfonyl)semicarbazide

Using the procedure described in Example 1, but replacing benzenesulfonyl isocyanate by m-bromophenylsulfonyl isocyanate, there is obtained 4-(m-bromophenylsulfonyl)semicarbazide.

EXAMPLE 6

4-(p-fluorophenylsulfonyl)semicarbazide

Using the procedure described in Example 1, but replacing benzenesulfonyl isocyanate by p-fluorophenylsulfonyl isocyanate, there is obtained 4-(p-fluorophenylsulfonyl)semicarbazide.

EXAMPLE 7

4,4'-[(4-methyl-m-phenylene)disulfonyl]bis semicarbazide

Using the procedure described in Example 1, but replacing benzenesulfonyl isocyanate by 4-methyl-m-phenylenedisulfonyl diisocyanate and doubling the proportion of hydrazine, there is obtained 4,4'-[(4-methyl-m-phenylene)disulfonyl]bis semicarbazide.

EXAMPLE 8

4-[3-(3-aminoureido)phenylsulfonyl]semicarbazide

Using the procedure described in Example 1, but replacing benzenesulfonyl isocyanate by m-isocyanatophenylsulfonyl isocyanate and doubling the proportion of hydrazine, there is obtained 4-[3-(3-aminoureido)phenylsulfonyl]semicarbazide.

EXAMPLE 9

4-[4-(3-aminoureido)phenylsulfonyl]semicarbazide

Using the procedure described in Example 1, but replacing benzenesulfonyl isocyanate by p-isocyanatophenylsulfonyl isocyanate and doubling the proportion of hydrazine, there is obtained 4-[4-(3-aminoureido)phenylsulfonyl]semicarbazide.

EXAMPLE 10

4-(ethylsulfonyl)semicarbazide

Using the procedure described in Example 1, but replacing benzenesulfonyl isocyanate by ethylsulfonyl isocyanate, there is obtained 4-(ethylsulfonyl)semicarbazide.

EXAMPLE 11

4-(6-chlorohexylsulfonyl)semicarbazide

Using the procedure described in Example 1, but replacing benzenesulfonyl isocyanate by 6-chlorohexylsulfonyl isocyanate, there is obtained 4-(6-chlorohexylsulfonyl)semicarbazide.

EXAMPLE 12

4-(dodecylsulfonyl)semicarbazide

Using the procedure described in Example 1, but replacing benzenesulfonyl isocyanate by dodecylsulfonyl isocyanate, there is obtained 4-(dodecylsulfonyl)semicarbazide.

EXAMPLE 13

4-(cyclohexylsulfonyl)semicarbazide

Using the procedure described in Example 1, but replacing benzenesulfonyl isocyanate by cyclohexylsulfonyl isocyanate, there is obtained 4-(cyclohexylsulfonyl)semicarbazide.

EXAMPLE 14

4-(p-methoxyphenylsulfonyl)semicarbazide

Using the procedure described in Example 1, but replacing benzenesulfonyl isocyanate by p-methoxyphenylsulfonyl isocyanate there is obtained 4-(p-methoxyphenylsulfonyl)semicarbazide.

EXAMPLE 15

4-(benzylsulfonyl)semicarbazide

Using the procedure described in Example 1, but replacing benzenesulfonyl isocyanate by benzylsulfonyl isocyanate, there is obtained 4-(benzylsulfonyl)semicarbazide.

EXAMPLE 16

4-(allylsulfonyl)semicarbazide

Using the procedure described in Example 1, but replacing benzenesulfonyl isocyanate by allylsulfonyl isocyanate there is obtained 4-(allylsulfonyl)semicarbazide.

EXAMPLE 17

4-(propargylsulfonyl)semicarbazide

Using the procedure described in Example 1, but replacing benzenesulfonyl isocyanate by propargylsulfonyl isocyanate, there is obtained 4-(propargylsulfonyl)semicarbazide.

EXAMPLE 18

4-(p-dimethylaminophenylsulfonyl)semicarbazide

Using the procedure described in Example 1, but replacing benzenesulfonylisocyanate by p-dimethylaminophenylsulfonyl isocyanate, there is obtained 4-(p-dimethylaminophenylsulfonyl)semicarbazide.

EXAMPLE 19

4-(naphthylsulfonyl)semicarbazide

Using the procedure described in Example 1, but replacing benzenesulfonyl isocyanate by naphthylsulfonyl isocyanate, there is obtained 4-(naphthylsulfonyl)semicarbazide.

EXAMPLE 20

4-(4-pyridylsulfonyl)semicarbazide

Using the procedure described in Example 1, but replacing benzenesulfonyl isocyanate by 4-pyridylsulfonyl isocyanate, there is obtained 4-(4-pyridylsulfonyl)semicarbazide.

EXAMPLE 21

4-(m-allyloxyphenylsulfonyl)semicarbazide

Using the procedure described in Example 1, but replacing benzenesulfonyl isocyanate by m-allyloxyphenylsulfonyl isocyanate, there is obtained 4-(m-allyloxyphenylsulfonyl)semicarbazide.

EXAMPLE 22

4-(m-β-methallyloxyphenylsulfonyl)semicarbazide

Using the procedure described in Example 1, but replacing benzenesulfonyl isocyanate by m-β-methallyloxyphenylsulfonyl isocyanate, there is obtained 4-(m-β-methallyloxyphenylsulfonyl)semicarbazide.

EXAMPLE 23

4-(p-nitrophenylsulfonyl)semicarbazide

Using the procedure described in Example 1, but replacing benzenesulfonyl isocyanate by p-nitrophenylsulfonyl isocyanate, there are obtained 4-(p-nitrophenylsulfonyl)semicarbazide.

EXAMPLE 24

*4-(m-ethoxycarbonylphenylsulfonyl)semicarbazide*

Using the procedure described in Example 1, but replacing benzenesulfonyl isocyanate by m-ethoxycarbonylphenylsulfonyl isocyanate, there is obtained 4-(m-ethoxycarbonylphenylsulfonyl)semicarbazide.

EXAMPLE 25

*4-(p-butoxycarbonylphenylsulfonyl)semicarbazide*

Using the procedure described in Example 1, but replacing benzenesulfonyl isocyanate by p-butoxycarbonylphenylsulfonyl isocyanate, there is obtained 4-(p-butoxycarbonylphenylsulfonyl)semicarbazide.

EXAMPLE 26

*4-(p-methylthiophenylsulfonyl)semicarbazide*

Using the procedure described in Example 1, but replacing benzenesulfonyl isocyanate by p-methylthiophenylsulfonyl isocyanate there is obtained 4-(p-methylthiophenylsulfonyl)semicarbazide.

EXAMPLE 27

*4-(isopropylsulfonyl)semicarbazide*

Using the procedure described in Example 1, but replacing benzenesulfonyl isocyanate by isopropylsulfonyl isocyanate, there is obtained 4-(isopropylsulfonyl)semicarbazide.

EXAMPLE 28

*4-(hexylsulfonyl)semicarbazide*

Using the procedure described in Example 1, but replacing benzenesulfonyl isocyanate by hexylsulfonyl isocyanate, there is obtained 4-(hexylsulfonyl)semicarbazide.

EXAMPLE 29

*4-(cycloheptylsulfonyl)semicarbazide*

Using the procedure described in Example 1, but replacing benzenesulfonyl isocyanate by cycloheptylsulfonyl isocyanate, there is obtained 4-(cycloheptylsulfonyl)semicarbazide.

EXAMPLE 30

*4,4'-(m-phenylenedisulfonyl)bissemicarbazide*

Using the procedure described in Example 1, but replacing benzenesulfonyl isocyanate by m-phenylenedisulfonyl diisocyanate, there is obtained 4,4'-(m-phenylenedisulfonyl)bissemicarbazide.

Similarly using the procedure described in Example 1, but replacing benzenesulfonyl isocyanate by p-phenylenedisulfonyl diisocyanate, there is obtained 4,4'-(p-phenylenedisulfonyl)bis-semicarbazide.

EXAMPLE 31

*4-(2,5-dimethylphenylsulfonyl)semicarbazide*

Using the procedure described in Example 1, but replacing benzenesulfonyl isocyanate by 2,5-dimethylphenylsulfonyl isocyanate, there is obtained 4-(2,5-dimethylphenylsulfonyl)semicarbazide.

EXAMPLE 32

*4-(2,4,6-trichlorophenylsulfonyl)semicarbazide*

Using the procedure described in Example 1, but replacing benzenesulfonyl isocyanate by 2,4,6-trichlorophenylsulfonyl isocyanate, there is obtained 4-(2,4,6-trichlorophenylsulfonyl)semicarbazide.

We claim:
1. A 4-organo sulfonyl semicarbazide selected from the group consisting of compounds having the formulae:

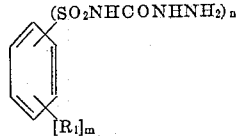

and $R_2SO_2CONHNH_2$ wherein $R_1$ is selected from the group consisting of lower-alkyl, lower-alkenyloxy, halo, nitro, lower-alkoxycarbonyl, lower-alkylthio, 3-aminoureido and

wherein $R_3$ and $R_4$ taken individually represent lower-alkyl and $R_3$ and $R_4$ taken together with the attached N atom represent a member selected from the group consisting of pyrrolidino, 2-methylpyrrolidino, 2,2-dimethylpyrrolidino, 3-ethylpiperidino, 4-isopropylpiperidino, N-methylpiperazino, N-ethylpiperazino, morpholino, and hexamethyleneimino, $n$ is an integer from 1 to 2, and $m$ is an integer from 0 to $(6-n)$ and wherein $R_2$ is selected from the class consisting of cycloalkyl from 4 to 8 carbon atoms, inclusive, and alkyl from 1 to 12 carbon atoms, inclusive.

2. A compound having the formula:

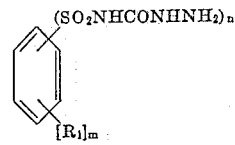

wherein $R_1$ is selected from the group consisting of lower-alkyl, lower-alkoxy, lower-alkenyloxy, halo-, nitro, lower-alkoxycarbonyl, lower-alkylthio, 3-aminoureido and

wherein $R_3$ and $R_4$ taken individually represent lower-alkyl and $R_3$ and $R_4$ taken together with the attached N atom represent a member selected from the group consisting of pyrrolidino, 2-methylpyrrolidino, 2,2-dimethylpyrrolidino, 3-ethylpiperidino, 4-isopropylpiperidino, N-methylpiperazino, N-ethylpiperazino, morpholino, and hexamethyleneimino, $n$ is an integer from 1 to 2, and $m$ is an integer from 0 to $(6-n)$.

3. 4-phenylsulfonylsemicarbazide.
4. 4-p-tolylsulfonylsemicarbazide.
5. 4-p-chlorophenylsulfonylsemicarbazide.
6. A compound having the formula

wherein R is selected from the class consisting of cycloalkyl from 4 to 8 carbon atoms, inclusive, and alkyl from 1 to 12 carbon atoms, inclusive.

References Cited

UNITED STATES PATENTS

| | | | |
|---|---|---|---|
| 3,102,115 | 8/1963 | Breuer et al. | 260—239 |
| 3,184,464 | 5/1965 | Haack et al. | 260—553 |

OTHER REFERENCES

Wright et al.; J. Med. & Pharm. Chem., vol. 5, (July 1962), pages 815–22.

HENRY R. JILES, *Primary Examiner.*

ALEX MAZEL, *Examiner.*

UNITED STATES PATENT OFFICE
CERTIFICATE OF CORRECTION

Patent No. 3,352,909            November 14, 1967

Adnan A. R. Sayigh et al.

It is hereby certified that error appears in the above numbered patent requiring correction and that the said Letters Patent should read as corrected below.

Column 12, line 7, for "$R_2SO_2CONHNH_2$" read -- $R_2SO_2NHCONHNH_2$ --; line 57, for "R" read -- $R_2$ --.

Signed and sealed this 31st day of December 1968.

(SEAL)
Attest:

Edward M. Fletcher, Jr.            EDWARD J. BRENNER
Attesting Officer                 Commissioner of Patents